United States Patent [19]

Cohrs

[11] Patent Number: 5,052,212
[45] Date of Patent: Oct. 1, 1991

[54] DYNAMIC LEAK DETECTOR

[75] Inventor: Gary D. Cohrs, Tempe, Ariz.

[73] Assignee: Calibron Systems, Inc., Scottsdale, Ariz.

[21] Appl. No.: 423,842

[22] Filed: Oct. 18, 1989

Related U.S. Application Data

[63] Continuation-in-part of Ser. No. 259,847, Oct. 19, 1988, abandoned.

[51] Int. Cl.$^5$ .................................... G01F 25/00
[52] U.S. Cl. ................................. 73/3; 73/47; 73/198
[58] Field of Search .................. 73/3, 47, 198

[56] References Cited

U.S. PATENT DOCUMENTS

| Re. 31,432 | 11/1983 | Francisco, Jr. | 73/3 |
|---|---|---|---|
| 3,403,544 | 10/1968 | Francisco, Jr. | 73/3 |
| 3,492,856 | 2/1970 | Francisco, Jr. | 73/3 |
| 4,372,147 | 2/1983 | Waugh et al. | 73/3 |
| 4,481,805 | 11/1984 | Dobesh | 73/3 |
| 4,569,220 | 2/1986 | Hopfe et al. | 73/3 |
| 4,627,267 | 12/1986 | Cohrs et al. | 73/3 |
| 4,628,724 | 12/1986 | Maurer | 73/3 |
| 4,637,244 | 1/1987 | Maurer et al. | 73/3 |
| 4,674,317 | 6/1987 | Cohrs et al. | 73/3 |
| 4,718,267 | 1/1988 | Capper | 73/3 |
| 4,766,759 | 8/1988 | Cohrs et al. | 73/3 |
| 4,794,785 | 1/1989 | Cohrs et al. | 73/3 |
| 4,829,808 | 5/1989 | West | 73/3 |

FOREIGN PATENT DOCUMENTS

| 8019377 | 10/1980 | Fed. Rep. of Germany. | |
| 1420754 | 1/1976 | United Kingdom | 73/3 |
| 2129569 | 5/1984 | United Kingdom | 73/3 |

OTHER PUBLICATIONS

*Flow Its Measurement and Control in Science and Industry Volume Two* William W. Durgin, Editor in Chief; pp. 731–740; 1981.

Primary Examiner—Tom Noland
Attorney, Agent, or Firm—Christie, Parker & Hale

[57] ABSTRACT

A dynamic leak detector is connected to a fluid flowmeter prover. The prover has a measurement chamber with a fluid inlet and a fluid outlet and a barrier which moves axially through the chamber between the fluid inlet and the fluid outlet. First and second spaced apart seals between the barrier and the chamber interior prevent fluid from passing through the barrier. The leak detector is connected to the space between the first and second seals and urges fluid to flow out through the seals into the chamber, while the prover is operating. If more than a threshold amount of fluid passes through the seals during a test run, the operator is alerted and the test run is rejected.

32 Claims, 7 Drawing Sheets

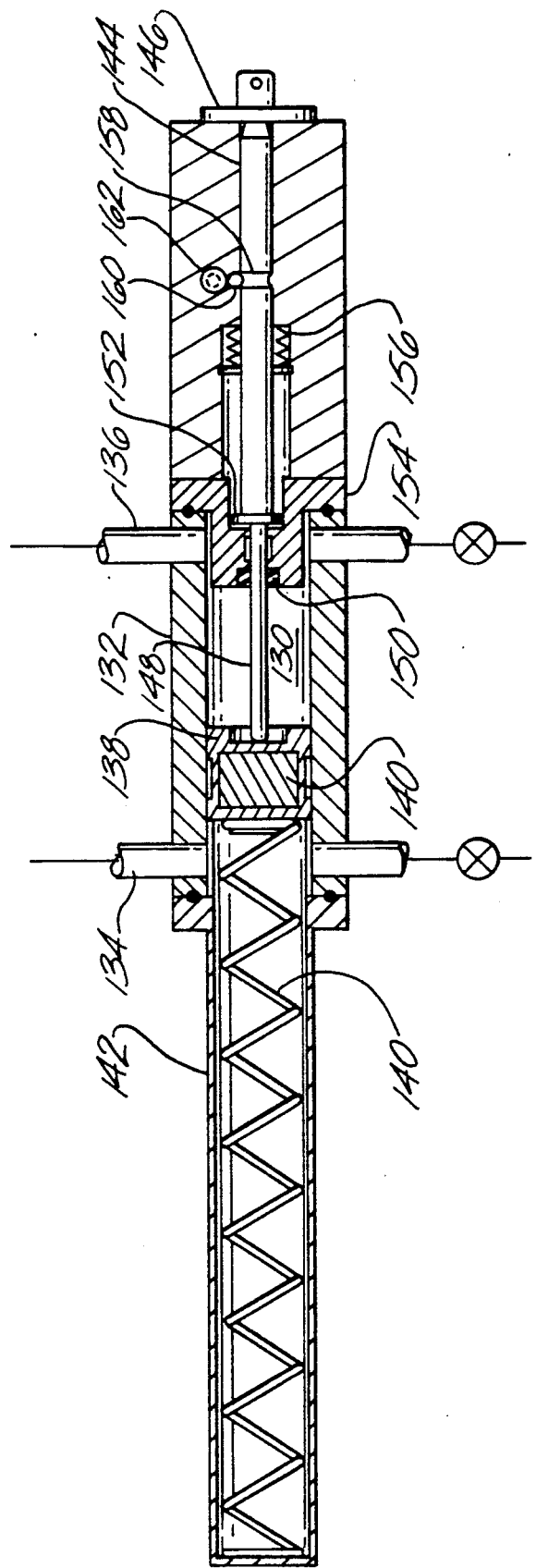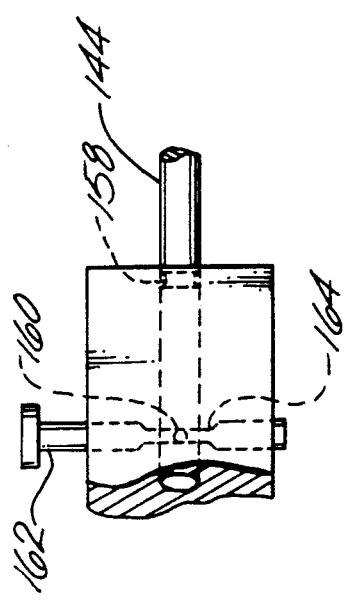

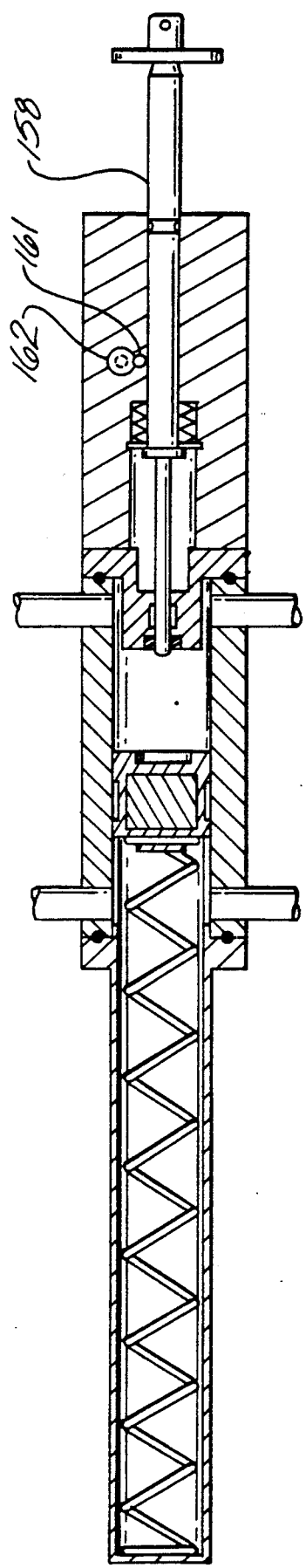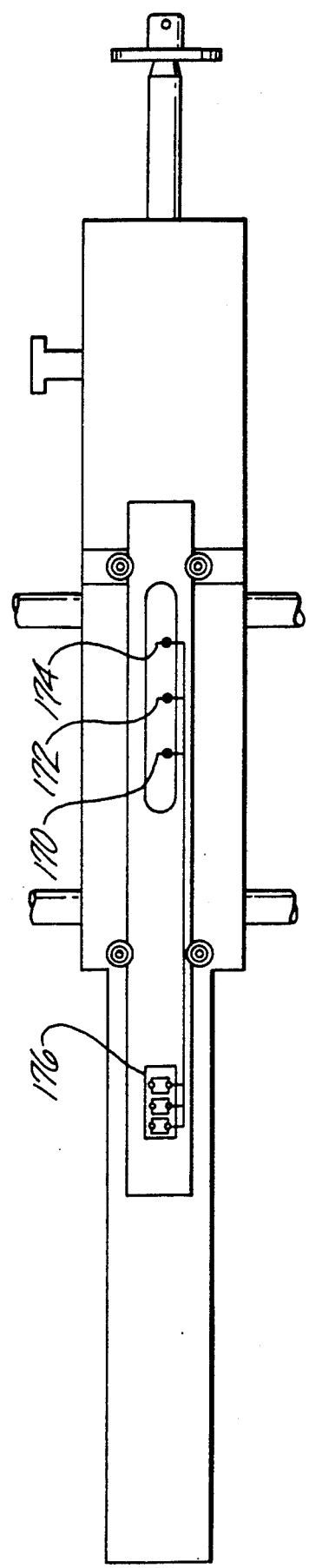

DYNAMIC LEAK DETECTOR

This application is a continuation-in-part of application Ser. No. 07/259,847 filed Oct. 19, 1988, priority of which is claimed under 35 U.S.C. § 120.

FIELD OF THE INVENTION

This invention relates to the field of measuring fluid flow and, more particularly, to a method and apparatus for detecting leaks in a fluid flowmeter prover.

BACKGROUND OF THE INVENTION

In order to obtain accurate readings from a flowmeter it must be periodically calibrated by determining its characteristic, i.e., the constant of proportionality between the flow rate of the fluid flowing through the flowmeter and the response given by the flowmeter. In the case of a turbine flowmeter that develops electrical oscillations proportional in number to the volume of flow through the flowmeter, this characteristic, called the K-factor, is expressed in terms of the number of pulses generated by the flowmeter per unit volume of fluid passing through the flowmeter. The flowmeter characteristic is a function of the type of fluid, as well as the fluid temperature, pressure, and flow rate, and varies as the parts of the flowmeter wear in the course of use. An apparatus to determine the characteristic of a flowmeter while in an operating fluid system is called a prover.

A known technique for determining the characteristic of a flowmeter is to compare its response to that of a positive displacement prover connected in series with the flowmeter. Such a prover employs a piston that travels in a cylindrical chamber in synchronism with the fluid traveling through the flowmeter. By measuring the time interval required for the piston to travel a given distance through the chamber, and thereby displace a given fluid volume during a test run, an average flow rate can be calculated which is used to determine the flowmeter characteristic. U.S. Pat. No. 3,492,856 discloses a prover in which the piston has a passage through it and a poppet valve that seals the passage when closed, and permits fluid flow through the passage from one side of the piston to the other when open. The valve is closed during each test run, but open at other times.

In a positive displacement prover, leakage through the piston seals from one part of the cylindrical chamber to another can seriously affect the accuracy of the measurement. As a result, pistons have been developed which have two O-ring seals against the interior of the cylinder and an annular cavity between the seals. A fluid line connects the cavity between the O-ring seals to a container so that the leakage can be measured. See, e.g., U.S. Pat. No. 4,372,147 to Waugh. The existing passive leak detection systems, however, may give inaccurate leakage readings because leaked fluid may remain in the fluid line, avoiding detection. In addition, existing passive leak detection systems do not indicate leakage through the poppet valve seals and they do not indicate leakage while the prover is in operation nor sort test runs according to whether leakage occurred during the run. Finally, they do not automatically verify that the leak detection system is functioning properly.

SUMMARY OF THE INVENTION

The present invention detects leaks in a prover, where the prover has a fluid chamber and a fluid barrier with two seals against the chamber, by urging fluid against the seals from a leak detection location. Fluid is supplied to the leak detection location from the prover. The present invention includes a dynamic system which detects leakage and detects malfunctions while the prover is in operation.

In another embodiment, the present invention includes a fluid conduit for detecting leaks through the seals of a prover. The prover has a measurement chamber with a measurement barrier located within the chamber. The barrier has a valve that can be opened to allow fluid flow through the barrier so that fluid may travel through the chamber. When the valve is opened, fluid flows through the conduit, indicating that the conduit is operational. When the valve is closed, leaks through both the barrier seals and the valve seals may be detected. The barrier has two spaced apart seals against the chamber and the valve has two spaced apart seals against the barrier. The conduit extends through the barrier and the valve to the space between the seals. A fluid filled cylinder is connected to the conduit, and a piston within the cylinder urges fluid through the conduit against the seals. The movement of the piston is monitored so that a signal is generated when the amount of fluid which moves past the seals exceeds a threshold amount, and when the valve is opened.

In another embodiment, the present invention provides a closed loop leak detection system connecting the space between the seals of a barrier in a prover to the fluid inlet or outlet of the prover. The system includes means for urging fluid through the conduit towards the space between the seals, and means for urging fluid through the conduit towards the leak detection system from the interior of the prover.

BRIEF DESCRIPTION OF THE DRAWINGS

FIG. 6 is a cross-sectional view of an alternate embodiment of the leak detection cylinder of the present invention and related components in its reset position.

FIG. 7 is an enlarged cross-sectional view of the latch pin and locking groove of the return plunger of FIG. 6.

FIG. 8 is a cross-sectional view of the leak detection cylinder of FIG. 6 immediately before a prover run.

FIG. 9 is an exterior view of the leak detection apparatus of FIG. 7 showing the location of the reed switches.

DETAILED DESCRIPTION OF THE INVENTION

The disclosures of U.S. Pat. No. 4,627,267, U.S. Pat. No. 4,152,922, and co-pending patent applications Ser. No. 07/259,847 and Ser. No. 07/259,879, filed Oct. 19, 1988, abandoned in favor of continuation-in-part applications Ser. No. 07/408,627, filed Sept. 18, 1989, now abandoned and Ser. No. 07/453,142, filed Dec. 12, 1989 are incorporated fully herein by reference.

Figure 1:
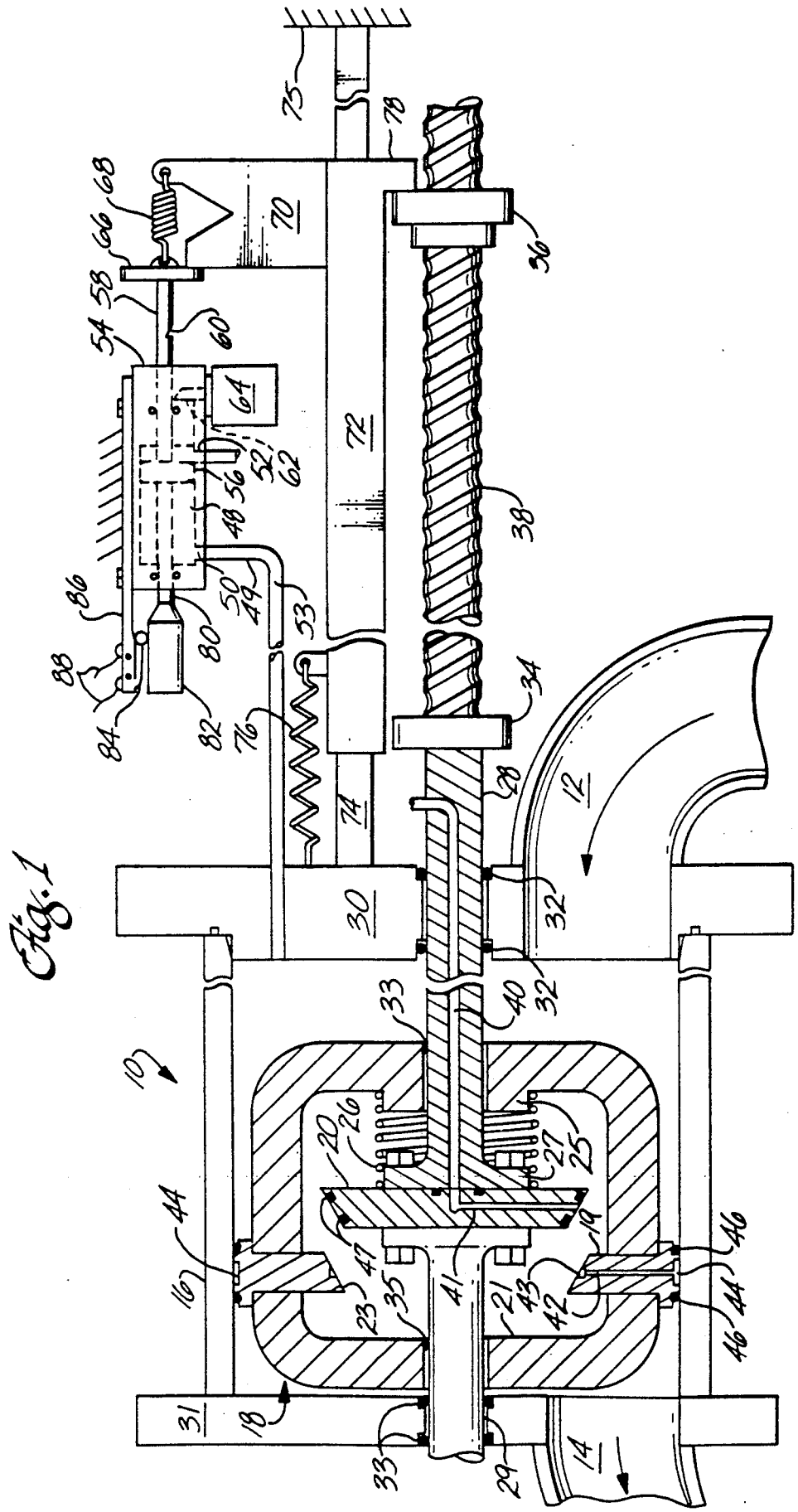
FIG. 1 is a cross sectional view of the leak detection apparatus of an embodiment of the present invention in conjunction with a positive displacement prover wherein the prover barrier is in its standby position between test runs at the downstream end of the measurement chamber.
Figure 3:
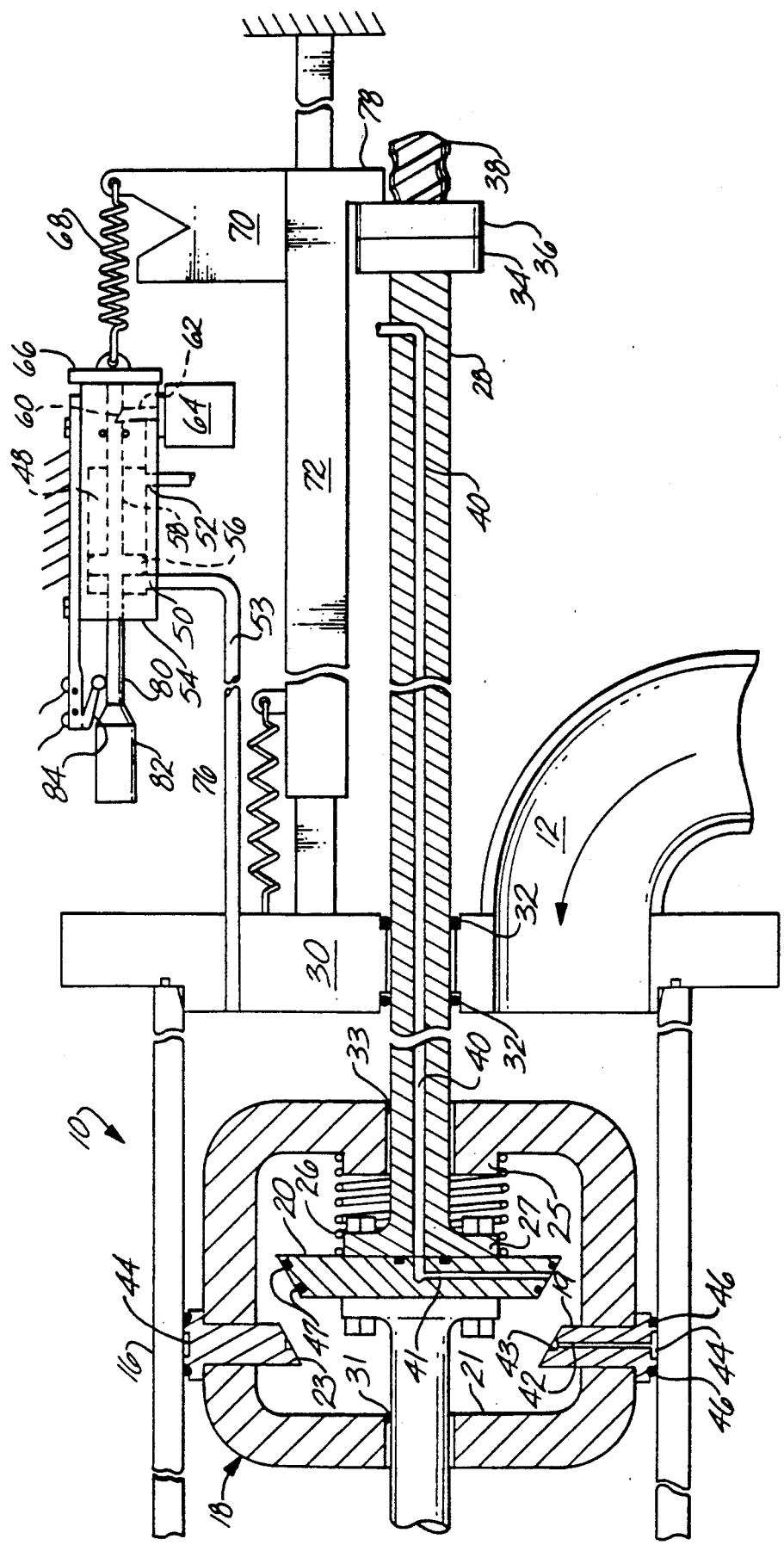
FIG. 3 is a cross sectional view of the leak detection apparatus and prover of FIG. 1 wherein the prover is in its reset position about to begin a test run.

In FIG. 1, a positive displacement prover 10 is connected in an operating fluid system, e.g., an oil pipeline, between a fluid inlet 12 and a fluid outlet 14. Prover 10 is connected in series with a flowmeter 112 (shown in FIG. 5) to calibrate the K-factor of flowmeter 112 using a K-factor computer 110 (shown in FIG. 5). Prover 10 includes a cylindrical fluid displacement measurement chamber 16 in which a fluid barrier 18 acts as the measuring piston. Fluid barrier 18 has a piston 19, a poppet valve 20, and a piston guide cage 21. Piston 19 fits snugly within fluid chamber 16 and rides axially in chamber 16 from end to end, i.e., from left to right and vice versa, in FIG. 1. Poppet valve 20 has a tapered outer periphery. Piston 19 has a tapered central opening 23 into which poppet valve 20 fits, as shown in FIG. 3.

Poppet valve 20 is bolted to an upstream valve rod 28 and a downstream valve rod 29. Upstream valve rod 28 extends towards the inlet end of fluid chamber 16 through an upstream valve rod guide sleeve 33 in piston guide cage 21 and out of chamber 16 through the chamber's end plate 30. Downstream valve rod 29 extends towards the outlet end of fluid chamber 16 through a downstream valve rod guide sleeve 35 in cage 21, and out of chamber 16 through the opposite end plate 31.

Cage 21 has a spring keeper 25 on the inside of its upstream end. The end of valve rod 28, which is connected to piston 19, has a spring keeper 27. A compression spring 26 is captured between spring keepers 25 and 27 to urge the poppet valve 20 closed, i.e., toward piston 19. Sleeves 31 and 33 ride on rods 29 and 28, respectively, to guide piston 19 as it slides back and forth relative to poppet valve 20 and valve rods 28 and 29, i.e., as poppet valve 20 opens and closes. The body of cage 21 has an open construction so as not to impede fluid flow when poppet valve 20 is open. Upstream valve rod 28 is sealed against end plate 30 with a pair of O-ring type seals 32, and downstream valve rod 29 is sealed against end plate 31 with a pair of O-ring type seals 33. A female coupling 34 is fastened to the end of valve rod 28 outside the fluid chamber 16 and rides on guide rails (not shown) parallel to valve rod 28.

Female coupling 34 is adapted to connect to a male coupling 36 when driven together by threaded drive shafts 38, threaded drive shafts 38 rotate independent of rod 28 to drive male coupling 36 back and forth i.e. towards and away from end plate 30. The operation and structure of the couplings and drive shafts are more fully described in co-pending application Ser. No. 07/259,879, filed on Oct. 19, 1989, which is incorporated herein by reference.

Figure 4:
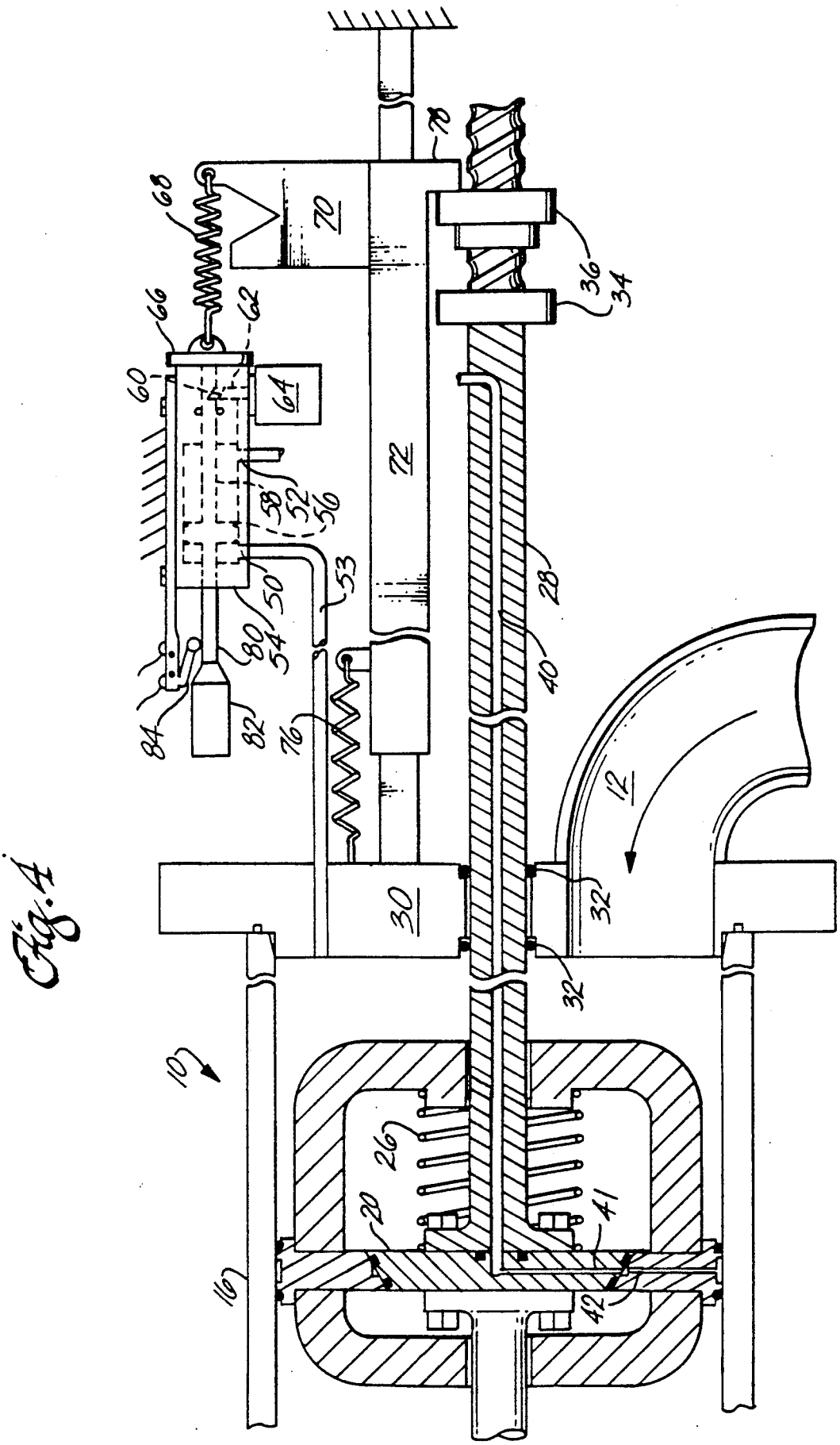
FIG. 4 is a cross sectional view of the leak detection apparatus and prover of FIG. 1 wherein the male coupling has released the prover barrier which accordingly has begun a test run.

An axial bore 40 is drilled through most of the length of valve rod 28 and connects to a radial bore 41 drilled through poppet valve 20 and a radial bore 42 drilled through the piston 19. The radial bore 42 passes through an annular groove 43 around the opening 23 and ends in an annular groove 44 around the periphery of the piston 19. Two O-ring type piston seals 46 are disposed in grooves on the periphery of piston 19 on either side of the peripheral annular groove 44. Two O-ring type seals 47 are disposed in grooves on either side of bore 41 on the outer periphery of poppet valve 20. When the poppet valve is closed, as shown in FIG. 4, this combination of bores creates a single continuous conduit from outer groove 44 between the seals through inner groove 43, upstream valve rod 28, and a flexible fluid pipe 49 to a leak detection apparatus.

The leak detection apparatus includes a leak detection cylinder 48 within a housing 54. The cylinder has a fluid inlet 50 and a fluid outlet 52. Pipe 49 is connected to outlet 52. Fluid inlet 50 is directly connected by a flexible fluid pipe 53 to the upstream end of fluid displacement measurement chamber 16 through upstream end plate 30. Within leak detection cylinder 48, a leak detection piston 56, sealed against the inside of the cylinder, moves back and forth between the fluid inlet 50 and fluid outlet 52. Fluid from chamber 16 fills cylinder 48 on both sides of piston 56, pipes 49 and 53, and bores 40, 41 and 42 to form a closed loop leak detection system.

Figure 2:
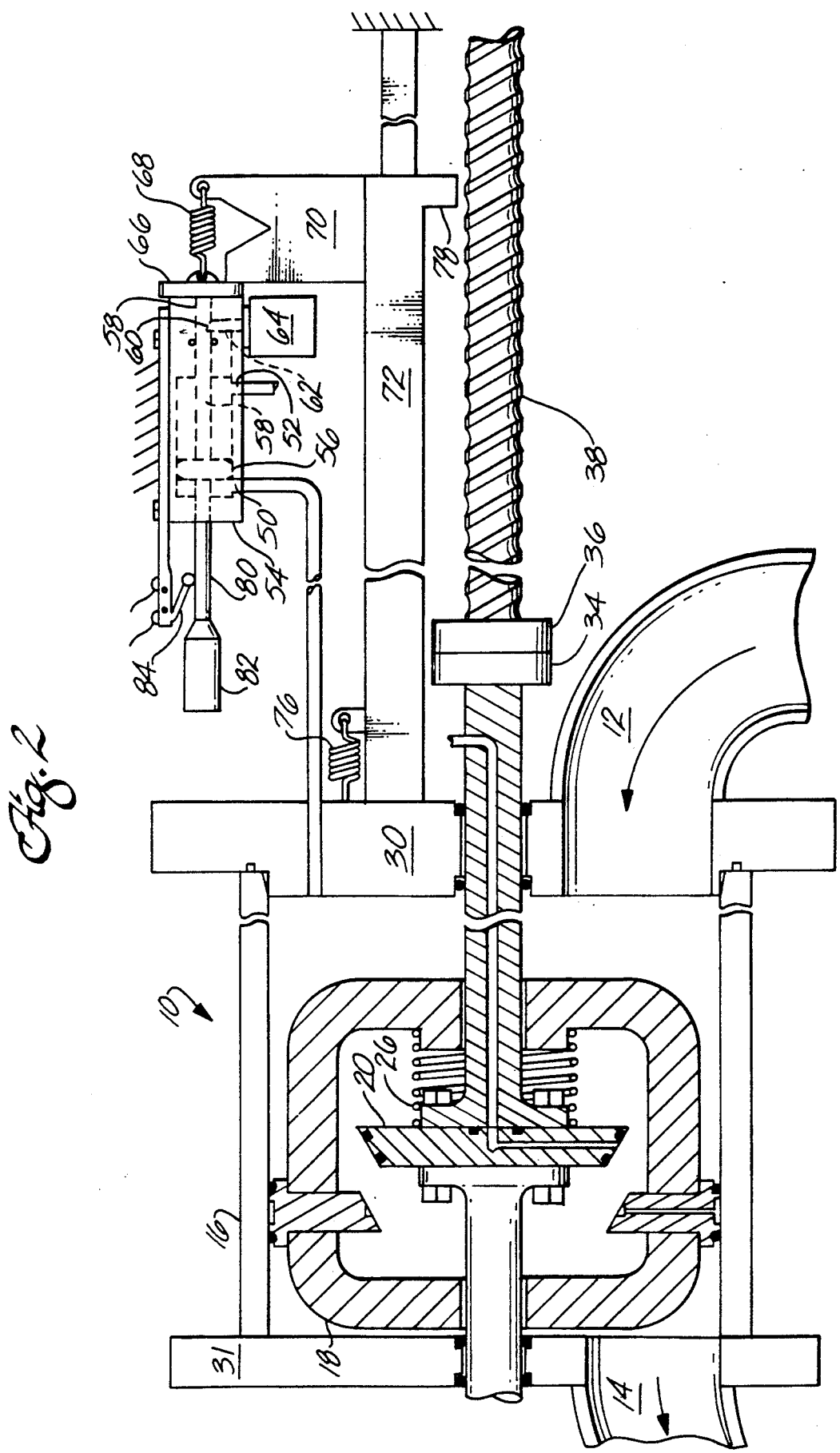
FIG. 2 is a cross sectional view of the leak detection apparatus and prover of FIG. 1 wherein the prover barrier is about to be drawn to its reset position by the male coupling.

Piston 56 is fastened to a piston rod 58 which extends through the end of cylinder 48 and housing 54. The piston rod has a notch 60. A pin 62, which is controlled by a solenoid 64, is designed to fit into the notch to latch the piston rod in place as shown in FIGS. 2 and 3.

A flag-arm 80 is fastened to the other side of leak detection piston 56. Flag arm 80 extends through housing 54 to an external flag 82. A leak detect microswitch 84 is connected to a mounting plate 86 to which housing 54 is also bolted. Wires 88 transmit the state of switch 84 to a display or control apparatus (not shown). Flag 82 is positioned so that when the piston moves a predetermined distance toward outlet 52, flag 82, moving with it, activates microswitch 84.

The leak detection apparatus has O-ring type seals analogous to seals 32, 33, and 46 of prover 10 to seal piston 56, rod 58, and flag-arm 80.

Piston 56 is also regulated by a piston control arm 70. Control arm 70 pulls piston 56 through a piston spring 68 connected to piston rod 58, and pushes piston 56 through a piston stop 66 also connected to piston rod 58. Control arm 70 is, in turn, attached to a control arm carriage 72 which is pulled by a carriage spring 76 and pushed by male coupling 36 acting on a flange 78 formed on the end of carriage 72. Carriage 72 rides on a fixed guide shaft 74 extending from measuring cylinder end plate 30 through to a rigid mounting point 75.

The construction of the leak detection apparatus can be better understood by considering its operation. In FIG. 1, fluid barrier 18 is at the downstream limit of its travel, which is the standby position between test runs. The downstream movement of poppet valve 20 is limited by a stop (not shown), but piston 19, damped by spring 26, travels beyond poppet valve 20, compressing spring 26, as shown in FIG. 1, as cage 21 comes to a stop at the downstream end of chamber 16. The stop may act on the end of rod 29 outside chamber 16 or directly on poppet valve 20 within chamber 16. Measurement chamber 16 is long, e.g., two or three feet, and is shown broken near the upstream end plate 30 to illustrate that the barrier is far from upstream end plate 30 and near downstream end plate 31 of chamber 16. The length chosen for the chamber 16 depends on the flow rate of fluid and the accuracy desired. The longer the chamber, the greater the accuracy. In FIG. 1, the prover has just completed a test run. Poppet valve 20 is open so that fluid can flow freely through fluid barrier 18 and measurement chamber 16 from fluid inlet 12 to fluid outlet 14.

With poppet valve 20 open, radial bore 41 within valve 20 is exposed to the fluid in chamber 16. Fluid outlet 52 of leak detection cylinder 48 is also open to the main fluid stream. As a result, fluid can flow freely within conduits 40, 41, 42, 49, 53 connecting leak detection cylinder 48 to measurement chamber 16. Leak detection piston 56 is free to move axially within cylinder 48 under the control of control arm 72. The open path from leak detection cylinder 48 to measuring chamber 16 ensures that conduits 40, 41, 42 and fluid lines 49, 53 are filled with fluid.

In FIG. 1 male coupling 36 is at the outermost extreme of its travel and holds flange 78 away from leak detection cylinder 48. This pushes piston control arm 70 away from cylinder 48. As a result, piston spring 68 fastened to control arm 70 draws leak detection piston 56, which moves freely, to the end of its travel near fluid outlet 52. Piston stop 66 bears against piston control arm 70 to limit travel of piston 56. In this position, flag 82 activates leak detect switch 84 which indicates to the operator that the leak detection apparatus is operating properly.

To begin another test run, male coupling 36 is driven by threaded drive shafts 38 to the opposite end of its travel where it engages female coupling 34 in order to bring barrier 18 to the upstream end of measurement chamber 16. FIG. 2 shows male coupling 36 connected to female coupling 34. Co-pending application Ser. No. 07/259,879 shows an example of how the coupling may be easily achieved. When male coupling 36 moves toward female coupling 34, control arm carriage 72, which, in FIG. 1, is held by male coupling 36 bearing against flange 78 is released. Accordingly, carriage 72 moves toward measurement chamber end plate 30 along with male coupling 36 due to the pull of carriage spring 76. Carriage 72 stops moving downstream when it strikes end plate 30 as shown in FIG. 2. Leak displacement piston 56, still moving freely, is pushed by control arm 70 bearing against piston stop 66 to the opposite extreme of its travel near fluid inlet 50. It is held in place there when solenoid 64 drives pin 62 into notch 60 in piston rod 58.

Male coupling 36 then draws fluid barrier 18 to the upstream end of measuring chamber 16 with poppet valve 20 opened, as explained in co-pending application Ser. No. 07/259,879.

FIG. 3 shows male coupling 36 at the end of its travel having pulled fluid barrier 18 to the upstream end of measurement chamber 16. Measurement chamber 16 is shown broken to the left of the fluid barrier to indicate that the barrier is very far from the downstream end of cylindrical chamber 16. As male coupling 38 nears the upstream end of its travel, it contacts flange 78 on piston control carriage 72 and draws piston control arm 70 away from leak detection cylinder 48. Piston 56, however, is held in place by pin 62 so that piston spring 68 is stretched. Poppet valve 20 remains open so that fluid continues to flow through the chamber.

When the measurement cycle or test run begins, poppet valve 20 is closed, as shown in FIG. 4. At the same time, male coupling 36 releases female coupling 36, and pin 62, which holds piston 56, is retracted. Closing poppet valve 20 creates a sealed, fluid-filled connection between groove 44 in fluid barrier 18 and outlet 52 of leak detection cylinder 48. This closed loop allows piston 56 to test seals 46, 47 for leaks. Releasing female coupling 34 lets fluid barrier 18 travel down measurement chamber 16 propelled by the fluid stream entering through fluid inlet 12.

Retracting pin 62 which holds leak piston 56 in place allows leak piston 56 to move, under the pull of spring 68, towards fluid outlet 52. However, if the fluid passageway from fluid outlet 52 to groove 44 in measuring piston 19 is sealed, leak piston 56 stays in place. Poppet valve 20 remains closed through the whole test run until it is forced open as barrier 18 reaches the downstream limit of its travel as shown in FIG. 1. Piston spring 68 pulls leak piston 56 until control arm 70 is allowed by male coupling 36 to move towards leak displacement cylinder 48. Male coupling 36 is held in place by drive shafts 38 and does not move until the end of the test run. Accordingly, piston 56 maintains a fluid pressure against seals 46, 47 throughout the test run.

If seals 46 or seals 47 cannot overcome the pressure caused by piston spring 68 through the various fluid passageways 40, 41 42, 44, 52, then fluid will leak out through seals 46 or 47 and leak piston 56 will move towards fluid outlet 52, the greater the leakage, the greater the movement. When leak piston 56 moves, it moves flag 82 as well. When the leakage is great enough, flag 82 will activate leak detect switch 84 indicating that there is a flaw in the seals.

Leak detect switch 84 is also used to show that the leak detection system is working properly. In normal use, fluid conduits 40, 41, 42 will be opened to the fluid in measurement chamber 16 whenever poppet valve 20 is opened. Poppet valve 20 is always opened at the end of each test run, when barrier 18 reaches the downstream end of its travel as shown in FIGS. 1 and 2. Leak detect switch 84 is then activated. If leak detect switch 84 is not activated, then either poppet valve 20 or the leak detect system is not working properly. The operator, as explained below, will be alerted so that he may service the system.

As it travels down measurement chamber 16, barrier 18 passes two switches, a start switch 90 (shown in FIG. 5), near the beginning of its travel, and a stop switch 92 (also shown in FIG. 5) near the end of its travel. These switches mark the part of measurement chamber 16 which is used for the calibrating measurement. The switches may be constructed using a variety of techniques well known in the art. Optical switches which sense the passing of barrier 18 as described in co-pending application Ser. No. 07/259,879 are presently preferred.

Figure 5:
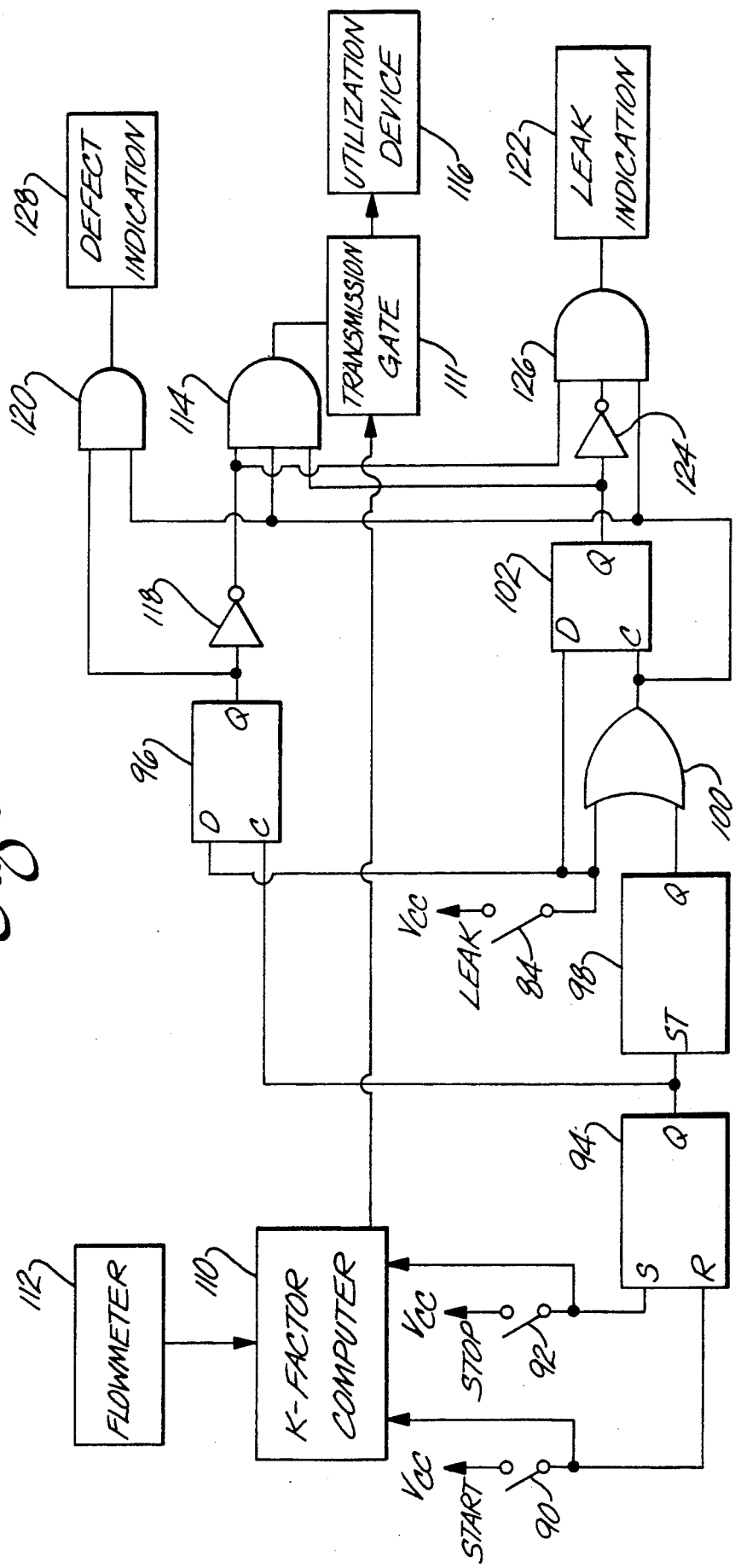
FIG. 5 is a schematic diagram of a logic circuit for interpreting the states of the leak detect switch.

FIG. 5 shows an electrical system which uses start switch 90, stop switch 92 and leak detect switch 84 to accept and reject test data and to signal the operator of leaks and breakdowns.

In FIG. 5, a computer 110 calculates the K-factor from data provided by start volume switch 90, stop volume switch 92, and the pulses from a flowmeter 112. Flowmeter 112 is the flowmeter being calibrated by the prover. Computer 110 could either be a programmed computer or hardware of the type shown in U.S. Pat. No. 3,403,544 to Francisco, Jr., issued Oct. 1, 1968. Depending upon the results of the dynamic leak test, the computed K-factor is either accepted or rejected. In the preferred embodiment, the output of computer 110 is coupled by a transmission gate 111 to a utilization device 116 such as a disc or tape memory, a computer, a printer or a video display terminal. The transmission gate 111 is controlled by a three input AND gate 114.

The circuitry applied to AND gate 114 for interpreting the dynamic leak test results comprises three D-type flip flops 94, 96, and 102, a time delay circuit 98, and an OR gate 100. Flip flop 94 has a reset input to which a source of direct current bias potential $V_{cc}$ is connected through switch 90, a set input to which bias current source $V_{cc}$ is connected through switch 92, and a Q output. Delay circuit 98 has a start input to which the Q output of flip flop 94 is connected. Flip flop 96 has a clock input to which the Q output of flip flop 94 is connected, a data input to which a bias current source $V_{cc}$ is connected by switch 84, and a Q output connected by an inverter 118 to an input of AND gate 114.

Flip flop 102 has a data input to which a bias current source $V_{cc}$ is connected through switch 84, a clock input to which the output of OR gate 100 is connected, and a Q output connected to an input of AND gate 114. The bias current source $V_{cc}$ is also connected through switch 84 to one input of OR gate 100. The Q output of delay circuit 98 is connected to the other input of OR gate 100. The output of OR gate 100 is connected to the remaining input of AND gate 114, and, as explained below, to the inputs of two other AND gates 120, 126.

In operation, at the beginning of a prover test run, switch 90 closes to clear flip flop 94, driving its Q output low. Switch 92 closes when barrier 18 reaches the end of the volume measurement. Switch 92 sets flip flop 94, driving its Q output high. As a result, delay circuit 98 starts to time out a fixed delay which ends after barrier 18 of prover 10 has come to rest at the downstream end of chamber 16 and poppet valve 20 is completely open. When flip flop 94 goes high, it sends a pulse to the clock input of flip flop 96 to sample the state of switch 84.

If a leak occurs during the volume measurement, i.e., in the interval between closure of switch 90 and switch 92, switch 84 closes indicating a premature end to the test run. Switch 84 applies a high level to the data input of flip flop 96. This drives the Q output of flip flop 96 high thereby signalling the occurrence of the leak during the prover test run.

If no leak occurs during the prover test run, a low level is applied to the data input of flip flop 96, and the Q output is low, signalling that there was no leak during the prover test run.

If a leak occurs after the prover test run but before delay circuit 98 times out, then, as switch 84 closes, a high level is applied through OR gate 100 to the clock input of flip flop 102 and the high level of switch 84 is applied directly to the data input of flip flop 102. This drives its Q output high and thereby signals the occurrence of a leak after the prover test run, which verifies the correct operation of the dynamic leak detector. When a leak occurs during a prover test run, the Q output of flip flop 102 also goes high, but its state is not significant because the K-factor computation is rejected due to the state of flip flop 96 as explained below.

After barrier 18 comes to rest at the downstream end of chamber 16, if piston 56 does not move enough to activate switch 84 then no leak is signaled by switch 84 even after delay circuit 98 times out. After delay circuit 98 times out, the Q output of delay circuit 98 goes high, and a high level is applied through OR gate 100 to the clock input of flip flop 102. Since the data input of flip flop 102, switch 84, is low the output of flip flop 102 is also low, signalling that the dynamic leak detector is defective.

In summary, the output of OR gate 100 serves to mark the end of the leak detection cycle either because the stop switch 92 or the leak switch 84 has been triggered. At that time, the states of flip flops 96 and 102 are interrogated to determine whether to accept or reject the prover test data, i.e., the calculated K-factor. Flip-flop 96 indicates if there is a leak in the seals and flip-flop 102 indicates if the system is working OR gate 100 indicates the end of a leak detection cycle.

The interrogation is performed by AND gate 114. At the end of the leak detection cycle, transmission gate 111 is enabled if the Q output of flip flop 96 is low and the output of flip flop 102 is high. The transmission gate 111 couples the K-factor data to utilization device 116. For any other combination of states of flip flops 96 and 102 at the end of the cycle, the transmission gate 111 is not enabled, and, as a result, the K-factor data is rejected.

If the K-factor data is rejected, it can also be ascertained whether the reason is a leak during a prover test run or a defective leak detector. If the Q output of flip flop 96 is high at the end of the cycle, irrespective of the state of flip flop 102, there is a leak. This is displayed by coupling the Q output of flip flop 96 and the output of OR gate 100 to the inputs of an AND gate 120 and the output of AND gate 120 to a leak indicator 122, which could be a lamp.

If the Q output of flip flop 96 is low and the Q output of flip flop 102 is low at the end of the cycle, the leak detector is defective. This is displayed by coupling the output of flip flop 96, the output of OR gate 100, and the output of flip flop 102 via an inverter 124 to the inputs of an AND gate 126 and the output of the AND gate 126 to a defect indicator 128, which could also be a lamp. The leak indicator 122 and defect indicator 128 could also be coupled to a computer which processes the test run data or some other device.

The system of FIG. 5 is a simple circuit for interpreting the action of leak detect switch 84 and for illustrating the function of leak detect switch 84. Similar functions could be performed with simpler or with more complex systems. The switches instead could be connected directly to a processor which could use software to interpret them, eliminating the logic circuit entirely.

The length of flag arm 82 and switch mounting plate 86 may be adjusted so that leak detect switch 84 is activated at any point in the travel of leak piston 56, depending on the needs of the operator. In addition, switch 84 and flag 82 may be constructed to indicate the distance that piston 56 travels after each test run or cycle. The distance piston 56 travels indicates the amount of leakage during each test run. Using this information the operator is notified of the condition of the seals before they require servicing.

Alternatively, the leak detection apparatus can be constructed using a bladder instead of leak detection piston 56 shown in the drawings. The bladder would be placed within leak detection cylinder 44 and its interior would be connected with fluid outlet 52. The bladder would attempt to contract, urging fluid down fluid outlet 52 through conduits 40, 41, 42 and against seals 46, 47, thereby testing the seals for leaks just as piston 56 does.

FIGS. 6 through 9 show another embodiment of a leak detection apparatus according to the present invention. The leak detection apparatus of FIGS. 6 through 9 can be substituted for that of FIGS. 1 through 4 without modifying the prover. The circuitry of FIG. 5 may also be used with the leak detection apparatus of FIGS. 6 through 9.

As with the embodiment of FIGS. 1 through 5, the leak detection apparatus of FIGS. 6 through 9 has a leak detection cylinder 130 within a housing 132, the cylinder has a fluid inlet 134 and a fluid outlet 136. The fluid inlet is connected to the flexible fluid pipe 53 shown in FIGS. 1 through 4 at the upstream end of the fluid displacement measurement chamber 16 and the fluid outlet is connected to pipe 49 which connects to passages 40, 41, 42 and 44 to test seals 46 and 47. Within the leak detection cylinder 130, there is a leak detection piston 138 sealed against the inside of the cylinder. The piston travels between the fluid inlet 134 and fluid outlet 136. In contrast to piston 56 of FIGS. 1 through 4, leak detection piston 138 is free floating and has no shafts connected to it. A magnet 140 is contained within the piston to cooperate with reed switches as discussed below.

The leak detection piston 138 is biased towards the fluid outlet 136 by a compression spring 140 which pushes directly against the piston. The compression spring is enclosed in a cylinder 142 which is open to the fluid inlet 134 and to the piston 138. The spring cylinder 142 has the same fluid in it as the leak detection cylinder 130 and the prover 10.

On the other side of the piston 138 is a return plunger 144. Outside the housing, 132 the return plunger has a piston stop 146 which connects to the control arm 70 of the prover in the same way as the leak detection assembly of FIGS. 1 through 4. At its opposite end, the return plunger 144 contacts a narrower plunger finger 148. The finger extends through return plunger seals 150 into the leak detection cylinder 130 to contact the leak detection piston 138 opposite the compression spring 140. On one end of the return plunger finger, opposite the piston, there is a stop 152 which limits the plunger finger's travel to between the leak detection cylinder end wall 154 in one direction and a set of Belville washers 156 in the opposite direction.

Similar to the notch 60 and pin 62 arrangement of the embodiment of FIGS. 1 through 4, the plunger 144 includes a groove 158 through which a solenoid driven mechanism can prevent movement of the piston between prover runs. The groove 158 can be engaged by a ball 160 which is, in turn, controlled by a solenoid driven latch pin 162. FIG. 7 shows the latch pin, ball and groove from a different perspective. As shown there, the latch pin has a recessed area 164 which, when aligned with the ball, allows the ball to move in and out of the groove 158. However, when the full radius shaft of the latch pin is brought against the ball 160, it is pushed into the groove 158 and prevents the return plunger from moving.

The leak detection apparatus of FIGS. 6 through 9 cooperates with the prover in largely the same way as the leak detection apparatus of FIGS. 1 through 4. FIG. 6 shows a leak detection apparatus in a condition analogous to that of FIG. 2. The piston 138 has been driven to the inlet end of the piston cylinder by the control arm 70 (shown in FIGS. 1–4) through the return plunger 144. The return plunger is latched into place by the solenoid driven latch pin 162 and the piston and spring cylinders 130, 142 are filled with fluid from the prover. The leak detector is reset for the start of a prover run.

FIG. 8 shows the leak detection apparatus during a prover run. This corresponds roughly to the condition of the leak detection apparatus in FIG. 4. When a prover run is reedy to start, the latch pin 162 is centered allowing the latch ball 160 to move out of the groove 158 in the plunger 144 and the control arm 70 pulls the plunger and the plunger finger away from the piston. This allows the piston to move under the force of the compression spring to the extent that fluid leaks through fluid outlet 136 through the seals. FIG. 8 shows the leak detection apparatus in the initial position at the start of a prover run. As shown, the leak detection piston has already moved a short distance from the position shown in FIG. 6. As the plunger finger is withdrawn through plunger seals 150, the volume of matter within the cylinder 130 is reduced. The piston accordingly moves far enough to compensate for this change of volume in the cylinder. As with the embodiments of FIGS. 1 through 4 the piston will move further if the seals leak. By measuring the travel of the piston the condition of the seals can be monitored.

FIG. 9 shows a set of reed switches 170, 172, 174 mounted to the cylinder housing exterior which allow the travel of the piston to be detected. The reed switches are activated when the piston magnet 140 travels by one of the narrow switches. The reed switch 170 to the extreme left as shown in FIG. 9 detects the piston magnet as it first moves past the position shown in FIG. 8. This indicates a minor leak. The center reed switch 172 detects the piston magnet when it moves significantly beyond the position shown in FIG. 8. This indicates a moderate leak. The reed switch 174 to the extreme right detects large movements of the piston and indicates a major leak. The reed switches are shown connected to an interface block 176 from which they connect to other circuitry. Any other number of reed switches may be used, however, two or three provide enough accuracy for most purposes.

To connect the reed switches of FIG. 9 to the circuitry of FIG. 5, the left or center reed switch could be used alone. When switch 170 is activated the condition is analogous to that when microswitch 84 is activated indicating that the piston has traveled far beyond the initial starting position and that either the poppet valve 20 is open or there is a significant leak. When the reed switch is not activated this would indicate, as in the case of microswitch 84, that the piston is in the starting position or the leak is relatively minor. By arranging a large number of reed switches along the outside of the cylinder housing, the precise location of the piston can be measured. This can provide a much more accurate indication of the seal's condition than the simple microswitch arrangement shown in FIGS. 1 through 5.

The embodiment of FIGS. 6 through 9 is preferred for use at high operating pressures when seals cause a large amount of drag. Since the piston is free floating, its travel is affected only by its own piston seals and not by the return plunger seals 150. This reduces the drag on the piston caused by the seals as compared to the embodiment of FIGS. 1–4. Accordingly, the piston responds more quickly and accurately to leak conditions.

The described embodiments of the invention are only considered to be preferred and illustrative of the inventive concept; the scope of the invention is not to be restricted to such embodiments. Various and numerous other arrangements may be devised by one skilled in the art without departing from the scope of this invention. The invention is equally applicable to gas or liquid systems and can be applied to any type of prover, although it is particularly designed for compensating for leaks through the seals of a ballistic prover.

What is claimed is:

1. A fluid flow measuring system comprising:
a cylindrical measurement chamber having an inlet end and an outlet end through which the flow rate is to be measured;
a fluid barrier disposed between the inlet and outlet ends of the chamber for axial movement through the chamber, the barrier having first and second spaced apart seals against the chamber, the barrier also having a valve for alternatively allowing and preventing fluid flow through the barrier, the valve having third and fourth spaced apart seals against the barrier; and
a leak detection conduit having an outlet in the space between the first and second seals, and in the space between the third and fourth seals.

2. System of claim 1 wherein the conduit is located within the interior of the barrier and the interior of the valve.

3. System of claim 1 wherein the conduit is in fluid communication with the interior of the chamber when the valve is opened.

4. System of claim 3 wherein the leak displacement means also comprises a leak detection cylinder having an inlet connected to the inlet end of the measurement chamber and an outlet connected to the conduit, the leak detection cylinder also comprising a piston disposed between the cylinder inlet and the cylinder outlet movable axially between the cylinder inlet and the cylinder outlet, the piston being biased towards the cylinder outlet.

5. System of claim 4 also comprising a leak detection means for indicating movement of the piston.

6. System of claim 5 wherein the leak detection means comprises a switch adapted to be engaged by an arm, the arm being fastened to the leak displacement piston so that the switch is engaged when the piston is displaced more than a threshold distance.

7. System of claim 1 wherein the conduit inlet is in fluid communication with a leak displacement means for urging fluid to enter the conduit outlet, and press upon the seals.

8. System of claim 1 also comprising a leak detection means coupled to the conduit for indicating whether the conduit is sealed against the interior of the measurement chamber.

9. System of claim 1 wherein the leak detection conduit also has an inlet, the inlet being in communication with the measurement chamber whereby fluid which leaks through the seal is displaced by fluid entering from the chamber.

10. System of claim 1 comprising means for generating a leak detection signal if more than a threshold amount of fluid flows through the leak detection conduit into the spaces between the seals.

11. In a prover for measuring the flow rate of a fluid through a chamber having a barrier sealed against the chamber which, during a prover run, travels in the chamber with the fluid flow being measured, and means for transmitting a flow measurement to a utilization device, a dynamic leak detector comprising:
means for detecting the presence of a leak through the barrier seals during a prover run;
means for signalling the presence of the leak to a prover operator; and
means for inhibiting the transmission of a flow measurement when a leak is detected during the prover run corresponding to the flow measurement.

12. The detector of claim 11 wherein the means for detecting comprises:
a fluid conduit for urging fluid from a fluid source through the barrier seals;
means for detecting the amount of fluid urged through the barrier seals; and
a switch activated when the amount of fluid which passes through the barrier seals exceeds a threshold amount.

13. The detector of claim 12 wherein the fluid conduit comprises a cylinder and a piston, the cylinder having an outlet in fluid communication with the barrier seals, and an inlet in fluid communication with the flow measurement chamber, the piston being disposed between the outlet and the inlet within the cylinder and sealed against the interior of the cylinder.

14. The detector of claim 11 wherein the means for transmitting the flow measurement comprises an electrical signal and the means for inhibiting the transmission comprises a logic gate responsive to the means for detecting the presence of a leak.

15. The detector of claim 11 wherein the means for detecting comprises:
a fluid conduit having an inlet in fluid communication with the chamber and an outlet in fluid communication with the barrier seals; and
means for urging fluid flow in the conduit toward the outlet.

16. The detector of claim 15 wherein the means for urging comprises:
a cylinder in the fluid conduit between the inlet and the outlet;
a piston movable axially within the cylinder separating the inlet and the outlet; and
means for urging the piston toward the fluid outlet.

17. The detector of claim 16 wherein the means for detecting comprises means for monitoring movement of the piston.

18. The detector of claim 17 wherein the means for detecting comprises means for resetting the piston to a start position before a prover run, and wherein the means for monitoring monitors movement of the piston away from the start position.

19. The detector of claim 16 wherein the means for detecting comprises means for resetting the piston to a start position before a prover run, and wherein the detector comprises means for inhibiting the transmission of the flow measurement when the piston is not reset to the start position before the prover run corresponding to the flow measurement.

20. In a prover for measuring the flow rate of a fluid having a flow measurement chamber and a barrier sealed against the chamber which, during a prover run, travels in the chamber with the fluid flow being measured, a leak detector comprising:
means for detecting leaks in the barrier seals during a prover run;
means for detecting malfunctions in the means for detecting leaks; and
means for signalling the presence of a malfunction to a prover operator.

21. The detector of claim 20 wherein the prover also comprises means for transmitting the flow measurement to a utilization device, and the detector also comprises means for inhibiting the transmission of the flow measurement when a leak is detected.

22. In a prover for measuring the flow rate of a fluid having:

a flow measurement chamber;

a barrier with first and second spaced apart seals against the chamber, the barrier being movable during a prover run within the chamber for measuring the flow rate; and a valve within the barrier for opening between prover runs to allow fluid to flow through the barrier, a leak detector comprising:

a conduit having an outlet to the space between the first and second seals, the conduit extending through the valve to the outlet so that when the valve is opened, the conduit is open to the flow measurement chamber;

means for urging fluid through the conduit outlet;

a detector for determining if more than a threshold amount of fluid has been urged through the conduit outlet; and means coupled to the detector for signalling the presence of a leak when more than a threshold amount of fluid has been urged through the conduit outlet.

23. The leak detector of claim 22 wherein the prover also comprises means for transmitting the flow measurement to a utilization device, and wherein the means for signaling the presence of a leak also comprises means for inhibiting the transmission of the flow measurement when a leak is indicated.

24. The leak detector of claim 22 also comprising:

means for detecting a prover run; and means for signalling a defect coupled to the means for detecting a prover run and the means for signalling the presence of a leak, the means for signalling a defect being actuated when no leak is signalled at the same time that no prover run is detected.

25. The leak detector of claim 24 wherein the prover also comprises means for transmitting the flow measurement to a utilization device, and wherein the means for signalling a defect also comprises means for inhibiting transmission of the flow measurement when a defect is signalled.

26. In a fluid flow measurement system having a flow measurement chamber and a fluid barrier which moves through the chamber in a prover run to measure flow through the chamber, the barrier having first and second spaced apart seals against the chamber, a leak detector comprising:

a fluid conduit having an inlet in fluid communication with the chamber and an outlet in fluid communication with the space between the seals;

a leak detection cylinder in the fluid conduit having an inlet in fluid communication with the conduit inlet and an outlet in fluid communication with the conduit outlet;

a leak detection piston in the cylinder between the cylinder inlet and the cylinder outlet;

means for opening the fluid conduit outlet to the chamber before each prover run;

a rod for contacting and moving the piston to a start position proximate the cylinder inlet upon opening of the fluid conduit outlet; and means for biasing the piston toward the cylinder outlet during each prover run.

27. The detector of claim 26 wherein opening the fluid conduit outlet to fluid communication with the chamber results in a drop in fluid pressure in the fluid conduit, and comprising means for detecting the drop in fluid pressure and for signalling the drop to a prover operator.

28. The detector of claim 26 wherein the barrier has a valve and the valve has third and fourth spaced apart seals against the barrier, and wherein the fluid conduit outlet is in communication with the space between the third and fourth seals.

29. The detector of claim 28 wherein the fluid conduit extends within the barrier and within the valve.

30. The detector of claim 28 wherein the mans for opening the fluid conduit outlet comprises means for opening the valve to expose the space between the third and fourth seals to fluid in the chamber.

31. The detector of claim 30 wherein the valve is opened when the barrier is in a start position before each prover run, the detector comprising means for signalling to a prover operator that the piston is in the start position by detecting fluid pressure in the conduit.

32. The detector of claim 31 wherein the prover has a means for transmitting the flow measurement to a utilization device, and the detector comprises means for inhibiting the transmission of the flow measurement when it has not been signalled that the piston is in the start position before the start of a prover run.

* * * * *